United States Patent [19]

Bourson et al.

[11] 4,451,333

[45] * May 29, 1984

[54] PROCESS FOR COOKING LIGNOCELLULOSIC MATERIALS INTENDED FOR THE PRODUCTION OF PAPER PULP WITH 1,2,3,4-TETRAHYDRO-9,10-ANTHRACENE-DIOL

[75] Inventors: Lucien Bourson, Bois Colombes; Serge Delavarenne, Francheville Le Haut; Pierre Tellier, Sainte-Foy-Les-Lyon, all of France

[73] Assignee: PCUK Produits Chimiques Ugine Kuhlmann, Courbevoie, France

[ * ] Notice: The portion of the term of this patent subsequent to Nov. 25, 1997 has been disclaimed.

[21] Appl. No.: 378,218

[22] Filed: May 14, 1982

Related U.S. Application Data

[63] Continuation of Ser. No. 274,757, Jun. 18, 1981, abandoned, which is a continuation of Ser. No. 57,987, Jul. 16, 1979, abandoned.

[30] Foreign Application Priority Data

Jul. 27, 1978 [FR] France .............................. 78 22218

[51] Int. Cl.$^3$ ................................................ D21C 3/20
[52] U.S. Cl. ...................................... 162/77; 162/72; 162/82; 162/90
[58] Field of Search ...................... 162/72, 77, 90, 82; 260/365, 369

[56] References Cited

U.S. PATENT DOCUMENTS

| | | | |
|---|---|---|---|
| 4,012,280 | 3/1977 | Holton | 162/72 |
| 4,036,680 | 7/1977 | Holton et al. | 162/72 |
| 4,181,565 | 1/1980 | Nakamura et al. | 162/72 |

FOREIGN PATENT DOCUMENTS

| | | | |
|---|---|---|---|
| 52-155202 | 12/1977 | Japan | 162/72 |
| 54-100332 | 8/1979 | Japan | 162/72 |

*Primary Examiner*—Steve Alvo
*Attorney, Agent, or Firm*—Pennie & Edmonds

[57] ABSTRACT

Process for cooking lignocellulosic materials by heating the said materials in a cooking solution containing caustic soda with or without an alkali metal sulphide, in which the solution used contains about 0.01% to 10%, preferably 0.05% to 2%, by weight of 1,2,3,4-tetrahydro-9,10-anthracene-diol based on the weight of the dry lignocellulosic material.

4 Claims, No Drawings

PROCESS FOR COOKING LIGNOCELLULOSIC MATERIALS INTENDED FOR THE PRODUCTION OF PAPER PULP WITH 1,2,3,4-TETRAHYDRO-9,10-ANTHRACENE-DIOL

This is a continuation of application Ser. No. 274,757, filed June 18, 1981, now abandoned which is a continuation of application Ser. No. 57,987, filed July 16, 1979, now abandoned.

TECHNICAL FIELD

The present invention relates to a process for cooking lignocellulosic materials such as wood, straw, flax, esparto, bagasse, etc. for the production of paper pulp and ultimately paper products. The invention also relates to the baths or liquors used in the process.

BACKGROUND ART

The preparation of paper pulp from lignocellulosic materials generally comprises a cooking stage with alkaline solutions or pulping liquors intended to dissolve the noncellulosic impurities, notably the lignin present, in a more or less large proportion according to the species of lignocellulosic materials being treated. Proteins, gums and hemicelluloses can also be eliminated by the alkaline cooking treatment. According to the conditions in which this treatment is effected, the cellulose may or may not undergo a certain chemical degradation. This chemical degradation modifies the qualities of the cellulose and alters its mechanical properties, which is prejudicial to its use for paper making.

Thus, the process of cooking with caustic soda which consists in the action of a solution of caustic soda, without any other additive, at elevated temperature and pressure on lignocellulosic material such as wood chips, leads generally to the production of pulps of weak characteristics with a poor yield.

The addition of an alkali metal sulphide to the caustic soda cooking liquor has been recognized for a long time to be beneficial and has given birth to the Kraft cooking process (also called "sulphate" process) which is universally used and which provides the greatest part of the chemical pulps employed in the world.

Unfortunately, the Kraft cooking process with caustic soda and sulphide gives volatile sulphurated compounds which pollute the atmosphere and, in spite of all the precautions taken to avoid this pollution, it is often very difficult to avoid it economically.

Studies have shown that the degradation of the cellulose in alkaline medium was due to the presence of a reducing group at the end of the cellulosic chain. It is at this level that the alkaline attack induces the cutting of the chain ("peeling" reaction), cf. SVENSK PAPERSTIDNIG, No. 9, May 15, 1966, p. 311. The addition of polysulphide or oxido-reducing compounds causes the reduction of the terminal aldehyde group into an alcohol group or its oxidation into carboxylic acid group and hinders the production of the degradation reaction.

It has been proposed to add to the caustic soda cooking solution, instead of the sulphide, sulphonated derivatives of anthraquinone (cf., East German Patent No. 98549 of June 20, 1973) but on operating in this way the pollution problems are not completely avoided. In the U.S. Pat. No. 4,012,280 of Mar. 15, 1977 it has been proposed to add to the cooking solution a non-sulphur containing quinone derivative such as anthraquinone, which does not introduce the atmospheric pollution problem.

DISCLOSURE OF THE INVENTION

According to the present invention, advantageous results are obtained by incorporating 1,2,3,4-tetrahydro-9,10-anthracenediol as an additive in the cooking solutions for lignocellulosic materials.

The 1,2,3,4-tetrahydro-9,10-anthracenediol is a known compound, which may be obtained for example by catalytic hydrogenation of anthraquinone (cf., SKITA, Ber., 1925, 58, 2685–97).

The addition of 1,2,3,4-tetrahydro-9,10-anthracenediol (4 HAD) to a cooking solution in the caustic soda cooking process enables the production pulps having mechanical properties similar to those of Kraft pulps, with similar yields and Kappa numbers.

The addition of this same compound, 4 HAD, to a cooking solution for the Kraft cooking process (or "sulphate" process) enables one to obtain an appreciable lowering of the Kappa index of the pulps without alteration of the mechanical properties. With identical Kappa numbers, yields can be obtained superior to those obtained for the reference Kraft pulp, that is, the pulp prepared by the Kraft process without any additive. Under the same conditions, the addition of anthraquinone instead of 1,2,3,4-tetrahydro-9,10-anthracenediol leads to pulps of inferior mechanical characteristics.

BEST MODES FOR CARRYING OUT THE INVENTION

According to this invention, in the case of a caustic soda cooking, proportions of caustic soda between about 10 and 25% by weight based on the weight of the dry lignocellulosic material and between about 0.01 and 10% of 1,2,3,4-tetrahydro-9,10-anthracenediol, preferably between about 0.05 and 2% by weight based on the weight of the dry lignocellulosic material are most advantageous. The weight ratio of cooking solution to the dry lignocellulosic material is advantageously between about 3 and 6 and the temperature of cooking being between 150° and 200° C. The cooking solutions used in this case are therefore aqueous baths containing between about 1.66% and 8.33% by weight of caustic soda and between about 0.00166% and 1.66%, preferably 0.0083% to 0.33% by weight of 1,2,3,4-tetrahydro-9,10-anthracenediol.

In the case of the Kraft cooking, the proportion of active alkali (by active alkali is meant the sum NaOH+Na$_2$S expressed in NaOH) is advantageously between about 10 and 25% by weight of caustic soda based on the dry lignocellulosic material, the sulphidity (by sulphidity is meant the percentage by weight of Na$_2$S with respect to the active alakli) is advantageously between about 15 and 30% by weight with respect to the active alkali, and the proportion of 1,2,3,4-tetrahydro-9,10-anthracenediol adjuvant is advantageously between about 0.01 and 10%, preferably between 0.05 and 2% by weight based on the weight of the dry lignocellulosic material. The weight ratio of cooking solution to dry lignocellulosic material is advantageously between about 3 and 6 and the temperature of cooking between 150° C. and 200° C. The cooking solutions used in this case are therefore aqueous baths having an amount of active alkali between about 1.66% and 8.33% by weight, a sulphidity of about 15 to 30% by weight with respect to the active alkali and containing about 0.00166% to 1.66%, preferably 0.0083% to 0.33% by weight of 1,2,3,4-tetrahydro-9,10-anthracenediol.

The following Examples illustrate the invention without limiting its scope:

EXAMPLE 1(a) [comparative-control]

Sea-pine chips are mixed with a caustic soda liquor containing 22 percent by weight caustic soda based on the dry sea-pine chips and a weight ratio of caustic soda liquor to pine chips of 4. The mixture is cooked in an autoclave at 170° C. for a period of 90 minutes and allowing 90 minutes to attain to cooking temperature.

EXAMPLE 1(b)

Example 1(a) is repeated three times maintaining all parameters constant, but 1,2,3,4-tetrahydro-9,10-anthracenediol is added to the pine chips soda liquor mixture prior to cooking in the amount 0.1 percent, 0.5 percent and 1 percent by weight based on the weight of the dry pine chips.

EXAMPLE 1(c) [comparative]

Example 1(a) is repeated maintaining all parameters constant but 0.5 percent by weight of anthraquinone based on the weight of the dry pine chips is added to pine chip soda liquor mixture prior to cooking.

After cooking, the five pulps produced in Examples 1(a), (b) and (c) are washed, disintegrated and screened on a grill of 0.3 mm (Vewerk classifier).

For each of the above pulps, the crude yield, the screened pulp yield, the Kappa index (according to French standard NFT 12018) are determined. The pH and the consumption of caustic soda are also determined on the liquors after cooking.

The results of these determinations are set forth below in Table I. This Table also gives, for comparison, the results obtained from a test using the conventional Kraft process.

TABLE I

| | Effect of addition of 1,2,3,4-tetrahydro-9,10-anthracenediol (4 HAD) to a caustic soda cooking liquor | | | | | |
|---|---|---|---|---|---|---|
| | Control without additive Ex. 1(a) | 4 HAD 0.1% Ex. 1(b) | 4 HAD 0.5% Ex. 1(b) | 4 HAD 1% Ex. 1(b) | Reference conventional Kraft | Anthraquinone 0.5% Ex. 1(c) |
| Crude yield, % | 50.0 | 46.5 | 44.9 | 45.2 | 44.9 | 46.8 |
| Screened yield, % | 48.6 | 45.8 | 44.7 | 45.0 | 44.7 | 46.2 |
| Kappa index (K.I) | 87.7 | 50.2 | 32 | 28.1 | 31.7 | 32.2 |
| pH of liquor after cooking | 12.4 | 12.4 | 12.4 | 12.4 | 11.8 | 12.3 |
| % caustic soda consumed with respect to wood | 15.8 | 16.7 | 17.8 | 18.0 | 17.0 in effective alkali | 17.5 |

The data shows that the addition of 1,2,3,4-tetrahydro-9,10-anthracenediol accelerates the delignification and makes it more selective. The effect is all the more marked as the quantity of adjuvant is greater. With 0.5% of 1,2,3,4-tetrahydro-9,10-anthracenediol the cooking with caustic soda becomes as effective as the conventional Kraft cooking from the point of view of the delignification. The 1,2,3,4-tetrahydro-9,10-anthracenediol has approximately the same effect as anthraquinone.

The reference raw pulp and those obtained with 0.5% of adjuvant (1,2,3,4-tetrahydro-9,10-anthracenediol or anthraquinone) in the cooking liquor have been beared on the Jokro mill and the sheets of a weight of about 70 g per m², have been produced on the Rapid Kothen machine for physical tests. The following mechanical characteristics have been determined on the sheets:
breaking length: standard AFNOR NFQ 03004
burst factor: standard AFNOR NFQ 03014
tear index: standard AFNOR NFQ 03011
folding endurance: standard AFNOR NFQ 03001

The results are collected in the following Table II.

TABLE II

| | Mechanical Characteristics of the Raw Pulps Refined at 40° SR (Schopper Riegler) | | | |
|---|---|---|---|---|
| | Control without additive Ex. 1(a) KI = 87.7 yield = 50% | 4 HAD 0.5% Ex. 1(b) KI = 32 yield = 44.9% | Anthraquinone 0.5% Ex. 1(c) KI = 32.2 yield = 46.8% | Kraft reference KI = 31.7 yield = 44.9% |
| breaking length, m | 4570 | 6730 | 7230 | 7130 |
| folding endurance | 230 | 1123 | 945 | 1854 |
| burst-factor | 2.81 | 4.72 | 5.07 | 5.71 |
| tear index | 1009 | 844 | 813 | 904 |

The data shows that the mechanical characteristics, therefore the quality, of the raw pulp obtained by cooking in caustic soda in the presence of 0.5% of 1,2,3,4-tetrahydro-9,10-anthracenediol are very near to those of the conventional Kraft pulp.

EXAMPLE 2(a) [comparative-control]

Sea-pine chips are mixed with a caustic soda-sulphide liquor (Kraft process of cooking) containing 22 percent by weight active alkali based on the dry sea-pine chips a sulphidity of 25 percent with respect to the active alkali, and a weight ratio of liquor to pine chips of 4. The mixture is cooked in an autoclave at 170° C. for a period of 120 minutes and allowing 90 minutes to attain to cooking temperature.

EXAMPLE 2(b)

Example 2(a) is repeated three times maintaining all parameters constant, but 1,2,3,4-tetrahydro-9,10-anthracenediol is added to the pine chips-liquor mixture prior to cooking in the amount 0.1 percent, 0.5 percent and 1 percent by weight based on the weight of the dry pine chips.

EXAMPLE 2(c) [comparative]

Example 2(a) is repeated maintaining all parameters constant but 0.5 percent by weight of anthraquinone based on the weight of the dry pine chips is added to pine chips-liquor mixture prior to cooking.

After cooking, the five pulps produced in Examples 2(a), (b) and (c) are washed, disintegrated and screened on a grill of 0.3 mm (Vewerk classifier).

For each of the above pulps, the same operations and determinations are carried out as described in Example 1.

The results of these determinations are set forth below in Tables III and IV.

TABLE III

Effect of the addition of 1,2,3,4-tetrahydro-9,10-anthracenediol (4 HAD) to a Kraft cooking liquor

|  | Control Kraft without additive Ex. 2(a) | 4 HAD Ex. 2(b) 0.1% | 4 HAD Ex. 2(b) 0.5% | 4 HAD Ex. 2(b) 1% | Anthra-quinone Ex. 2(c) 0.5% |
|---|---|---|---|---|---|
| Crude, yield, percent | 44.9 | 44.9 | 44.3 | 44.6 | 44.0 |
| Screened yield, percent | 44.7 | 44.7 | 44.2 | 44.5 | 43.8 |
| Kappa index (KI) | 31.7 | 26.7 | 25.0 | 21.6 | 24.3 |
| pH of cooking liquor | 11.8 | 11.7 | 11.8 | 11.8 | 12.1 |
| % of effective alkali consumed with respect to wood | 17.0 | 17.3 | 17.6 | 18.9 | 17.4 |

TABLE IV

Mechanical characteristics of the Raw Pulps refined at 40° SR

|  | Control Ex.2(a) KI = 31.7 yield = 44.9% | 4 HAD 0.5% Ex. 2(b) KI = 25 yield = 44.3% | Anthra-quinone 0.5% Ex. 2(c) KI = 24.3 yield = 44% |
|---|---|---|---|
| breaking length, m | 7130 | 7140 | 5850 |
| Folding endurance | 1854 | 1345 | 985 |
| burst factor | 5.71 | 5.79 | 4.48 |
| tear index | 904 | 885 | 808 |

It is found that the addition of 1,2,3,4-tetrahydro-9,10-anthracenediol (4 HAD) increases the speed and the selectivity of the delignification in the course of a Kraft cooking. In the operative conditions used, this effect is indicated by a decrease in the Kappa index of the pulps without reduction of the yield of the cooking when the amount of 4 HAD used is increased.

The addition of 0.5% of 4 HAD enables the Kappa index of a Kraft pulp from sea pine to be reduced from about 32 to 25 (for 0.5 percent 4 HAD). The addition of 1,2,3,4-tetrahydro-9,10-anthracenediol is much more advantageous than that of anthraquinone which, as is shown by the mechanical characteristics of the raw pulps, causes a relatively large degradation of the cellulose.

We claim:

1. A process for cooking lignocellulosic materials which comprises heating the lignocellulosic materials to a temperature between 150° C. and 200° C. in a cooking solution containing caustic soda and 0.01% to 10% by weight of 1,2,3,4-tetrahydro-9,10-anthracene-diol based on the weight of the dry lignocellulosic material to produce a paper pulp.

2. A process according to claim 1, in which the cooking solution contains 0.05% to 2% by weight of 1,2,3,4-tetrahydro-9,10-anthracenediol based on the weight of the dry lignocellulosic material.

3. A process according to either of claims 1 or 2, in which the cooking solution contains an alkali metal sulfide, 10 to 25% by weight of caustic soda based on the weight of the dry lignocellulosic material, and in which the weight ratio of cooking solution to dry lignocellulosic material is between about 3 and 6.

4. A process according to either of claims 1 or 2 in which the cooking solution contains an alkali metal sulfide, an amount of active alkali of 10% to 25% by weight based on the weight of the dry lignocellulosic material, a sulfidity of 15% to 30% by weight based on the weight of the active alkali, and in which the weight ratio of cooking solution to dry lignocellulosic material is between about 3 and 6.

* * * * *